United States Patent
Kodera

(10) Patent No.: US 11,414,042 B2
(45) Date of Patent: *Aug. 16, 2022

(54) NON-COATED AIR BAG FABRIC AND AIR BAG

(71) Applicant: SEIREN CO., LTD., Fukui (JP)

(72) Inventor: Shota Kodera, Fukui (JP)

(73) Assignee: SEIREN CO., LTD., Fukui (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/651,635

(22) PCT Filed: Sep. 27, 2018

(86) PCT No.: PCT/JP2018/036070
§ 371 (c)(1),
(2) Date: Mar. 27, 2020

(87) PCT Pub. No.: WO2019/065894
PCT Pub. Date: Apr. 4, 2019

(65) Prior Publication Data
US 2020/0307497 A1    Oct. 1, 2020

(30) Foreign Application Priority Data
Sep. 29, 2017  (JP) .............................. JP2017-192245

(51) Int. Cl.
*B60R 21/235* (2006.01)
*D03D 1/02* (2006.01)
*B60R 21/237* (2006.01)

(52) U.S. Cl.
CPC ............. *B60R 21/235* (2013.01); *D03D 1/02* (2013.01); *B60R 21/237* (2013.01);
(Continued)

(58) Field of Classification Search
CPC ............... B60R 21/235; B60R 21/237; B60R 2021/23509; B60R 2021/23542;
(Continued)

(56) References Cited

U.S. PATENT DOCUMENTS 6,607,995 B1 *   8/2003  Takeuchi ........... D03D 15/0083
                                              442/216
9,878,684 B2 *   1/2018  Tanaka .................. D03D 11/00
(Continued)

FOREIGN PATENT DOCUMENTS

CN       101205650 A       6/2008
JP       02139435 A    *   5/1990
(Continued)

OTHER PUBLICATIONS https://patents.google.com/patent/JPH0790747A/en?oq=PCT%2fJP2018%2f036070 (Year: 1993) (Year: 1993).*
(Continued)

*Primary Examiner* — Arti Singh-Pandey
(74) *Attorney, Agent, or Firm* — Birch, Stewart, Kolasch & Birch, LLP

(57) ABSTRACT

A non-coated air bag fabric according to the present invention is woven using fibers containing polyethylene terephthalate as a main raw material, the fabric has a cover factor of 2350 or more, and a single fiber fineness of a yarn that constitutes the fabric is 2.0 dtex to 4.0 dtex inclusive.

5 Claims, 8 Drawing Sheets

(52) U.S. Cl.
CPC ............... *B60R 2021/23509* (2013.01); *B60R 2021/23542* (2013.01); *B60R 2021/23576* (2013.01); *D10B 2331/04* (2013.01); *D10B 2505/124* (2013.01)

(58) Field of Classification Search
CPC ............ B60R 2021/23576; D03D 1/02; D10B 2331/04; D10B 2505/124
See application file for complete search history.

(56) References Cited

U.S. PATENT DOCUMENTS

| | | | | |
|---|---|---|---|---|
| 10,760,188 | B2* | 9/2020 | Kodera | .................... D03D 1/02 |
| 2013/0089725 | A1 | 4/2013 | Jung et al. | |
| 2015/0329998 | A1 | 11/2015 | Ise | |
| 2018/0208147 | A1* | 7/2018 | Yokoi | ........................ D06L 1/12 |
| 2018/0281737 | A1* | 10/2018 | Houraiya | ................. D03D 1/02 |
| 2018/0319359 | A1* | 11/2018 | Harabayashi | ........ D03D 13/004 |
| 2020/0024798 | A1* | 1/2020 | Akechi | ................ D06N 3/0006 |
| 2020/0047704 | A1* | 2/2020 | Kodera | ................. B60R 21/237 |
| 2020/0247348 | A1* | 8/2020 | Kodera | .................... D03D 1/02 |
| 2021/0016739 | A1* | 1/2021 | Kodera | .................... D01F 6/62 |

FOREIGN PATENT DOCUMENTS

| | | | | |
|---|---|---|---|---|
| JP | 6-146132 | A | 5/1994 | |
| JP | 6-184856 | A | 7/1994 | |
| JP | 7-54238 | A | 2/1995 | |
| JP | 7-90747 | A | 4/1995 | |
| JP | 8-11660 | A | 1/1996 | |
| JP | 2013-528719 | A | 7/2013 | |
| JP | 2015-17356 | A | 1/2015 | |
| JP | 2015-143407 | A | 8/2015 | |
| WO | WO-2017010458 | A1 * | 1/2017 | ............. D06N 3/128 |
| WO | WO 2017/057300 | A1 | 4/2017 | |
| WO | WO-2017057300 | A1 * | 4/2017 | ........... B60R 21/235 |
| WO | WO-2017104529 | A1 * | 6/2017 | ............. D06N 3/128 |

OTHER PUBLICATIONS

International Search Report issued in PCT/JP2018/036070 (PCT/ISA/210), dated Dec. 4, 2018.
Written Opinion of the International Searching Authority issued in PCT/JP2018/036070 (PCT/ISA/237), dated Dec. 4, 2018.
Chinese Office Action and Search Report (including an English translation therof) issued in the corresponding Chinese Patent Application No. 201880062607.9 dated Feb. 1, 2021.
Extended European Search Report for European Application No. 18863060.2, dated Jun. 4, 2021.

* cited by examiner

FIG. 8

| | Work. Ex. 1 | Work. Ex. 2 | Work. Ex. 3 | Work. Ex. 4 | Work. Ex. 5 | Work. Ex. 6 | Work. Ex. 7 | Work. Ex. 8 | Comp. Ex. 1 | Comp. Ex. 2 | Comp. Ex. 3 | Comp. Ex. 4 |
|---|---|---|---|---|---|---|---|---|---|---|---|---|
| Material | Polyethylene terephthalate | | | | | | | | | | Nylon | |
| Total fineness [dtex] | 470 | 470 | 470 | 470 | 470 | 470 | 385 | 330 | 470 | 470 | 350 | 350 |
| Filament number | 144 | 144 | 144 | 144 | 182 | 144 | 96 | 144 | 96 | 144 | 72 | 108 |
| Single fiber fineness [dtex] | 3.3 | 3.3 | 3.3 | 3.3 | 2.6 | 3.3 | 4.0 | 2.3 | 4.9 | 3.3 | 4.9 | 3.2 |
| Weave density Warp (#/2.54 cm) | 55 | 57 | 61 | 55 | 57 | 62 | 70 | 72 | 53 | 53 | 59 | 63 |
| Weave density Weft (#/2.54 cm) | 55 | 57 | 60 | 55 | 57 | 60 | 66 | 68 | 53 | 53 | 59 | 60.5 |
| Cover factor | 2385 | 2471 | 2602 | 2385 | 2471 | 2602 | 2669 | 2543 | 2298 | 2298 | 2208 | 2310 |
| Thickness [mm] | 0.517 | 0.3 | 0.117 | 0.323 | 0.192 | 0.100 | 0.30 | 0.25 | 0.26 | 0.31 | 0.28 | 0.28 |
| Air permeability [ml/cm²·sec] | 0.517 | 0.292 | 0.117 | 0.323 | 0.192 | 0.100 | 0.217 | 0.095 | 1.300 | 0.070 | 0.080 | 0.080 |
| Recovery ratio evaluation Length after load was removed [mm] | 235 | 240 | 230 | 230 | 217 | 225 | 205 | 223 | 213 | 160 | 223 | 210 |
| Recovery ratio evaluation Period of time until recovery ratio reached 90% [min] | 40 | 40 | 60 | 45 | 55 | 60 | 120 | 70 | 148 | 420 | 200 | 250 |
| Recovery ratio evaluation Recovery speed [mm/min] | 0.88 | 0.75 | 0.67 | 0.89 | 0.96 | 0.75 | 0.54 | 0.67 | 0.39 | 0.26 | 0.24 | 0.24 |
| Recovery ratio evaluation Determination | A | A | A | A | A | A | B | A | C | D | D | D |

NON-COATED AIR BAG FABRIC AND AIR BAG

TECHNICAL FIELD

The present invention relates to a fabric used in an air bag that is widely used as an occupant protection device at the time of vehicle collision, and particularly to a non-coated air bag fabric and an air bag obtained from the same.

BACKGROUND ART

Air bag devices are commonly provided in a vehicle as a safety device for occupant protection that protects an occupant from impact upon vehicle collision. Conventionally, in order to prevent gas released from an inflator from leaking from the bag, fabric coated with a resin material was mainly used. However, fabric needs to be light in weight due to demands for improvements in fuel consumption and the like, and an air bag needs to be compactly housed due to trends in steering wheel design and the like. Thus, in recent years, non-coated fabric has been widely adopted for use with air bags (e.g., Patent Literature 1).

CITATION LIST

Patent Literature

Patent Literature 1: JP H6-146132A

SUMMARY OF INVENTION

Technical Problem

Incidentally, an air bag is folded and housed, and deploys by gas released from an inflator upon vehicle collision. However, because the air bag is housed in a folded state for a long period of time, there are cases where creases are formed. The inventor of the present invention found that there is a possibility that some air bags may not smoothly deploy due to such creases even if gas is injected. The present invention was made to resolve this issue, and an object thereof is to provide an air bag base cloth capable of inhibiting deployment failure resulting from creases, and an air bag formed by this air bag base cloth.

Solution to Problem

A non-coated air bag fabric according to the present invention is woven using fibers containing polyethylene terephthalate as a main raw material, the fabric has a cover factor of 2350 or more, and a single fiber fineness of a yarn that constitutes the fabric is 2.0 dtex to 4.0 dtex inclusive.

In the above-described non-coated air bag fabric, the cover factor may be 2450 or more.

In the above-described non-coated air bag fabric, the single fiber fineness may be 3.0 dtex or less.

The above-described non-coated air bag fabric may have a thickness of 0.30 or less.

An air bag according to the present invention is formed by at least one piece of main body base cloth formed by any of the above-described non-coated air bag fabrics.

Advantageous Effects of Invention

According to the present invention, it is possible to inhibit deployment failure resulting from creases.

BRIEF DESCRIPTION OF DRAWINGS

FIG. 8 is a table showing the physical property values and the results of the evaluation tests of Working Examples 1 to 8 and Comparative Examples 1 to 4.

DESCRIPTION OF EMBODIMENTS

Overview of Non-Coated Air Bag Fabric

Figure 1:
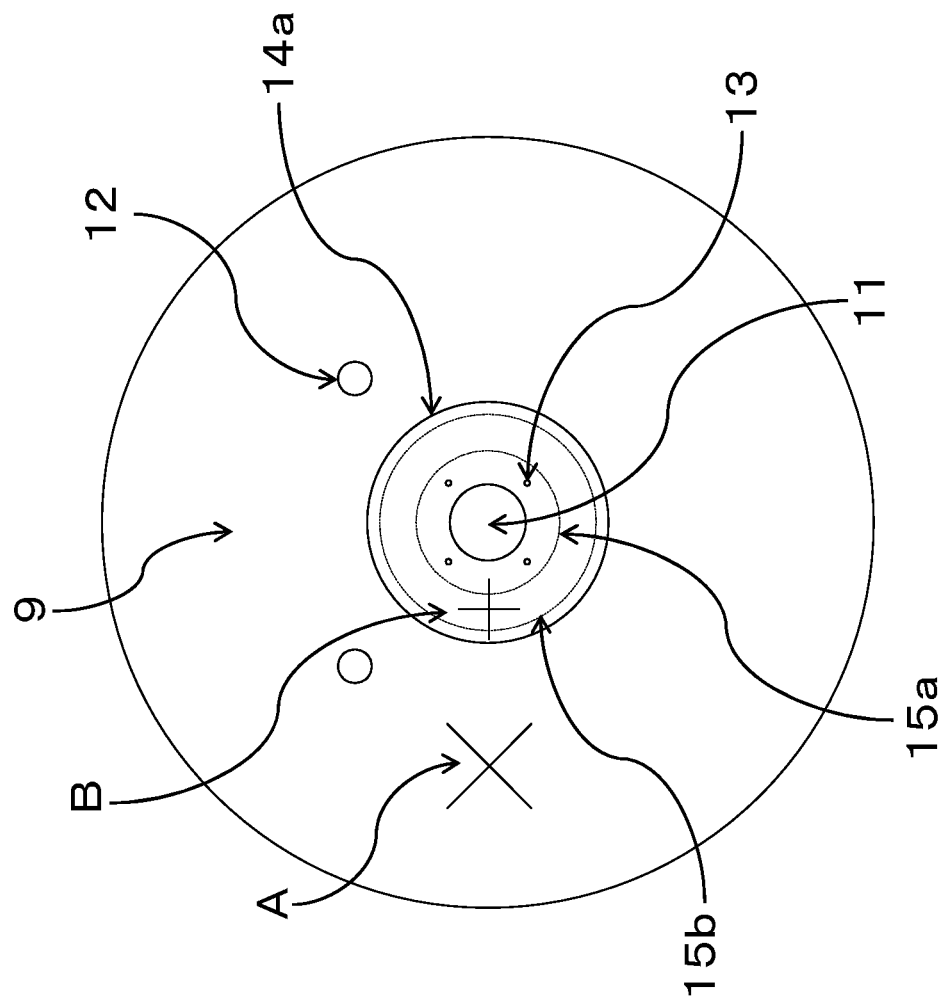
FIG. 1 is a front view showing a state in which three pieces of annular cloth are sewn to an air bag mounting port-side main body base cloth.

A non-coated air bag fabric according to the present invention is mainly made of polyethylene terephthalate, and the fabric has a cover factor of 2350 or more, and a single fiber fineness of a yarn that constitutes the fabric is 2.0 dtex to 4.0 dtex inclusive.

Hereinafter, this fabric will be described in more detail. First, this fabric is made of polyethylene terephthalate. Although an air bag fabric has been conventionally made mainly of nylon, there is a risk that creases will be likely to form because nylon is likely to elongate when an airbag is folded, and when the air bag deploys, creases may prevent smooth deployment. From this point of view, an air bag fabric according to the present invention is made of polyethylene terephthalate.

Next, a cover factor will be described. It is important that the cover factor of the fabric according to the present invention is 2350 or more. By setting the cover factor to 2350 or more, gaps between weaving yarns are small and excellently low air permeability can be obtained. Also, because the cover factor relates to the density of a fabric, the smaller the cover factor is, the smaller the density of the fabric is. Thus, there is a risk that creases will be likely to form, recovery from the state in which an air bag is folded to a deployment state will be insufficient, and smooth deployment will be inhibited. Thus, the cover factor is preferably large, and may be 2400 or more, 2430 or more, and 2460 or more, for example. On the other hand, if the cover factor is larger than 2800, there is a risk that the flexibility of a fabric will be impaired, and smooth deployment will actually be prevented, and there is also a risk that the fabric will not be compactly folded. From this point of view, the cover factor is preferably 2700 or less, and more preferably 2650 or less. Note that a cover factor is a value calculated using the equation below in the present invention.

$$\text{Cover factor} = \text{warp density of fabric} \times \sqrt{\text{total fineness of warp}} + \text{weft density of fabric} \times \sqrt{\text{total fineness of weft}}$$

The weave densities of the warp and the weft of the fabric are each preferably 48 to 75/2.54 cm, and more preferably 55 to 68/2.54 cm, in terms of performance such as the weavability and air permeability. However, a density difference between the warp and the weft is preferably small.

With regard to the air permeability of the fabric of the present invention, air permeability that is measured using a Frazier method is preferably 0.5 ml/cm$^2$·sec or less, and more preferably 0.3 ml/cm$^2$·sec or less. By setting the air permeability to be the above-described value, if a base cloth for an air bag is formed using the fabric of the present invention, gas leakage from the surface of this base cloth is reduced, the size of an inflator can be reduced, and quick deployment is possible.

Yarns that constitute the fabric of the present invention preferably have a total fineness of 280 dtex or more. If the total fineness of yarns is 280 dtex or more, the strength of the fabric becomes more superior as an air bag. Also, the total fineness is preferably 560 dtex or less and more preferably 470 dtex or less because a lightweight fabric can be easily obtained.

Yarns that constitute the fabric may be the same or different from each other. The fabric may be constituted by yarns having different single fiber finenesses (=total fineness/the number of filaments), for example. Specifically, it is preferable to use a yarn having a single fiber fineness of 2.0 to 4.0 dtex, and a yarn having a single fiber fineness of 2.0 to 3.0 dtex is more preferable, for example. By setting the single fiber fineness to 4.0 dtex or less, it is possible to increase the flexibility of the fabric, improve the foldability of the air bag, and also reduce the air permeability.

Also, if the single fiber fineness is high, there is a risk that creases will be likely to form, preventing smooth deployment of an air bag. Thus, the upper limit of the single fiber fineness is preferably 4.0 dtex, and more preferably 3.0 dtex. On the other hand, a single fiber fineness is preferably 2.0 dtex or more because if the single fiber fineness is excessively low, single fibers are unlikely to break in the spinning process, the weaving process, or the like.

With the present invention, by taking balance between the cover factor and the single fiber fineness into consideration and setting the single fiber fineness in the above-described range, it is possible to inhibit deployment failure resulting from creases of an air bag. If the single fiber fineness is larger than 3.0 dtex, for example, the cover factor is preferably 2450 or less, and more preferably 2400 or less. On the other hand, if the single fiber fineness is 2.5 dtex to 3.0 dtex inclusive, the cover factor is preferably 2350 or more, more preferably 2450 or more, and particularly preferably 2450 to 2500 inclusive. Also, if the single fiber fineness is smaller than 2.5 dtex, the cover factor is preferably 2500 or more.

Also, it is sufficient that the cross-sectional shape of a single fiber is selected from a circle, an ellipse, a flattened shape, a polygon, a hollow shape, other variants, and the like. It is sufficient to use mixed fibers, doubling yarns, combined use yarns, mixed use yarns thereof (the warp and the weft have different cross-sectional shapes), or the like as needed, and to appropriately select the cross-sectional shape to the extent that the spinning process, the fabric production process, the fabric physical properties, and the like are not hindered.

One or more of various additives that are usually used to improve spinnability, processability, durability, and the like of fibers may be used for these fibers, examples including a heat-resistant stabilizer, an antioxidant, a light-resistant stabilizer, an aging resister, a lubricant, a smoothing agent, a pigment, a water repellent agent, an oil-repellent agent, a masking agent such as titanium oxide, a gloss imparting agent, a flame retardant, and a plasticizer.

The structure of the fabric may be any of a plain weave, a basket weave, a grid weave (ripstop weave), a twill weave, a cord weave, a leno weave, a mock leno weave, and a composite structure thereof. Beside a two-axis design with warp and weft, a multi-axis design including axes that are inclined at 60 degrees may be adopted as needed, and in this case, the arrangement of yarns need only be in conformity with the same arrangement of the warp or the weft. Among these, plain weave is preferable in terms of ensuring the tightness of the structure, the physical properties, and the evenness of the performance.

The weave densities of the warp and the weft of the fabric are each preferably 48 to 68/2.54 cm in terms of performance such as the weavability and air permeability.

Also, the fabric preferably has a thickness of 0.30 mm or less, for example. This is because if the thickness is excessively large, there is a risk that the flexibility will decrease, and smooth deployment from a folded state will be prevented. Note that the thickness can be measured in conformity with method A in JIS L 1096 8.4, for example.

Air Bag

An air bag of the present invention can be obtained by joining at least one piece of main body base cloth obtained by cutting the fabric of the present invention into a desired shape. All pieces of main body base cloth that constitute the air bag are preferably constituted by the fabric, or a portion thereof may be constituted by the fabric. Also, it is sufficient to select the specifications, shape, and volume of the air bag in accordance with the site at which the air bag is to be disposed, the application, housing space, the performance of absorbing occupant impact, the output of the inflator, and the like. Furthermore, a reinforcement cloth may be added according to required performance, and a non-coated fabric that is equivalent to the main body base cloth, a non-coated fabric that is different from the main body base cloth, or a fabric that is coated with a resin and is different from the main body base cloth may be selected as the base cloth used as the reinforcement cloth.

Although joining of the main body base cloths, joining of a main body base cloth and a reinforcement cloth or a hanging string, and fixing of other cut base cloths are performed mainly by sewing, it is possible to use partial adhesion, welding, or the like in combination, or use a joining method employing weaving or knitting. That is, there is no particular limitation on the joining method as long as the air bag has satisfactory durability, impact resistance at the time of deployment, the performance of absorbing occupant impact, and the like.

It is sufficient that cut base cloths are sewn together using a sewing method that is applied to a general air bag, such as lock stitches, multi-thread chain stitches, one side down stitches, looping, safety stitches, zigzag stitches, flattened stitches, or the like. Also, it is sufficient that the fineness of the sewing thread is 700 dtex (corresponding to #20) to 2800 dtex (corresponding to #0), and the stitch count is 2 to 10 stitches/cm. If stitch lines with a plurality of columns are required, it is sufficient to use a multi-needle sewing machine with the distance between stitch lines being about 2 mm to 8 mm, but if the distance of a sewn portion is not long, sewing may be performed using a single-needle sewing machine a plurality of times. If a plurality of base cloths are used as an air bag body, a plurality of base cloths may be sewn together in a stacked state, or sewn together one by one.

It is sufficient that the sewing thread used for sewing is selected as appropriate from among threads that are generally called synthetic threads and threads that are used as industrial sewing threads. Examples thereof include nylon 6, nylon 66, nylon 46, polyester, macromolecular polyolefin, fluorine containing, vinylon, aramid, carbon, glass, and steel yarns, and any of a spun yarn, a filament twisted yarn, or a filament resin processed yarn may be used.

Furthermore, in order to prevent gas leakage from stitches of outer circumferential sewn portions or the like, a sealing material, an adhesive, an adhering material, or the like may be applied to, sprayed onto, or stacked on upper portions and/or lower portions of stitches, gaps between stitches, a margin to seam, or the like.

The air bag of the present invention can be applied to applications in passenger cars, commercial vehicles, buses, motorcycles, and the like as various bags for occupant protection, such as side bags and center bags for front collision protection and side collision protection of a driver/passenger seat, headrest bags for rear seat occupant protection (front collision and rear collision) and headrest bags for rear collision protection, knee bags and foot bags for leg and foot protection, mini bags for infant protection (child seats), bag bodies for an air belt, and bags for pedestrian protection, and furthermore, as long as the function requirements are satisfied, the air bag of the present invention can be applied in multiple applications such as ships, railroad trains, electric railcars, aircraft, and amusement park equipment.

Figure 2:
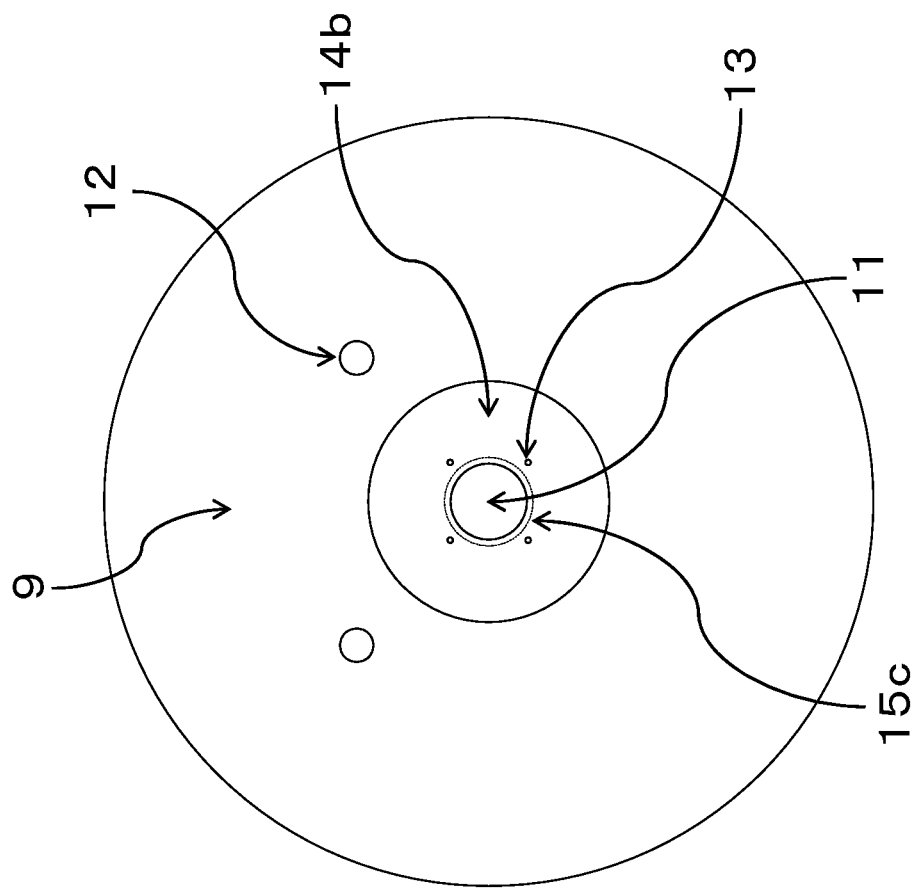
FIG. 2 is a front view showing a state in which four pieces of annular cloth are sewn to the air bag mounting port-side main body base cloth.
Figure 3:
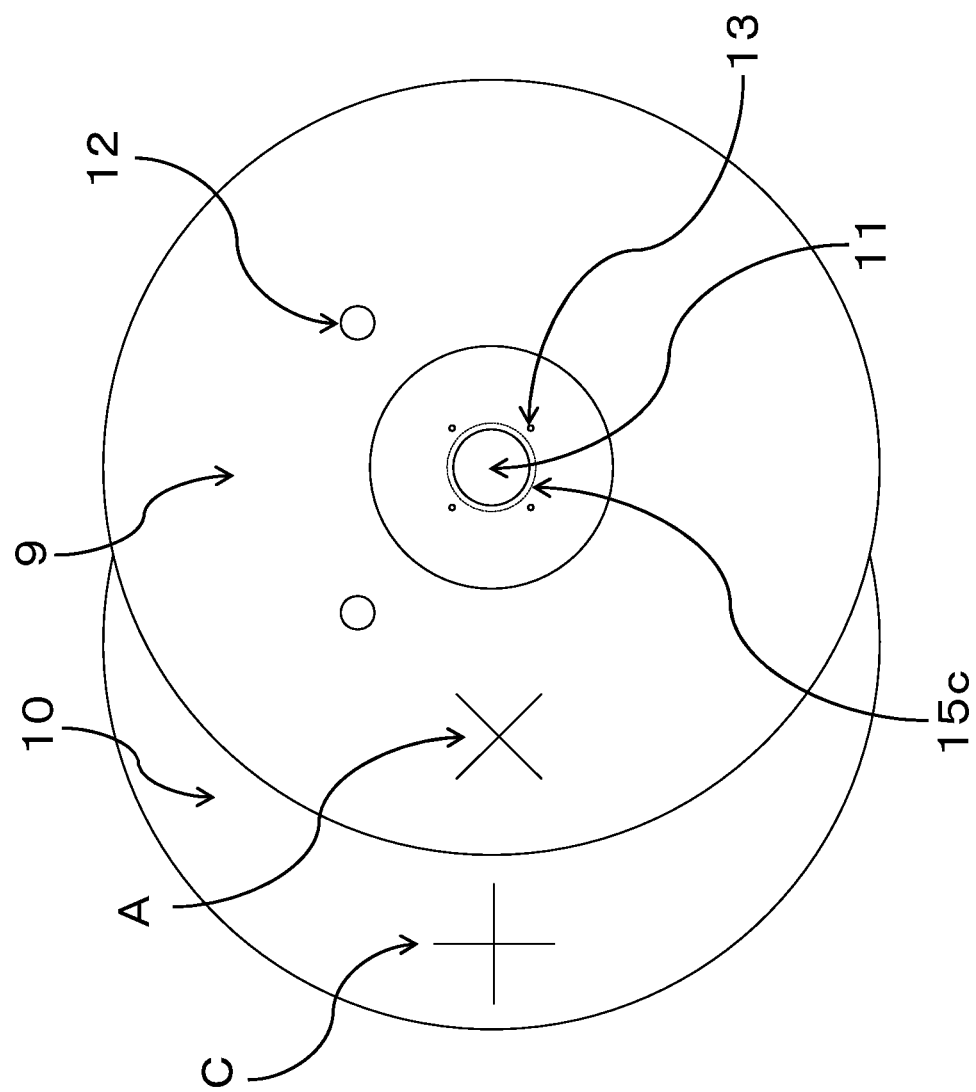
FIG. 3 is a front view showing the manner in which the air bag mounting port-side main body base cloth and an occupant-side main body base cloth are stacked.
Figure 4:
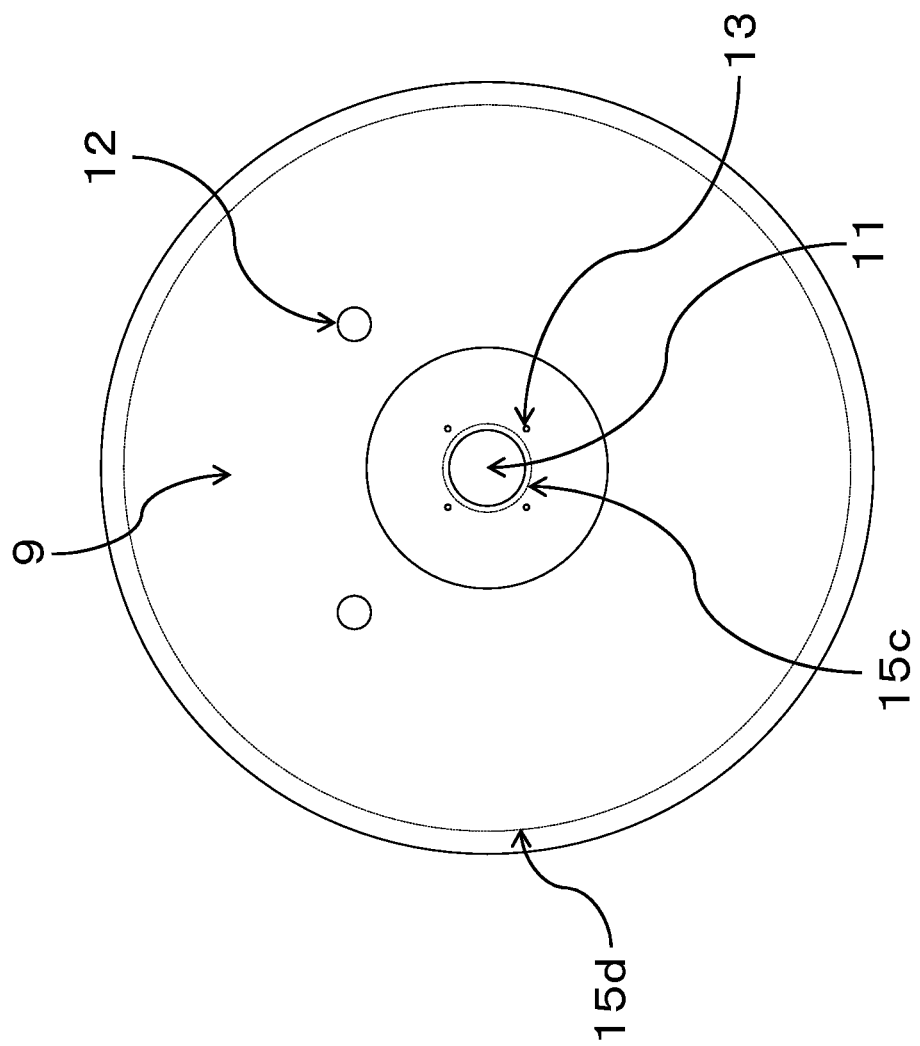
FIG. 4 is a front view showing a state in which the air bag mounting port-side main body base cloth and the occupant-side main body base cloth are sewn together.

Next, an example of a specific method for producing an air bag will be described below with reference to FIGS. 1 to 4. FIG. 1 is a front view showing a state in which three pieces of annular cloth are sewn to an air bag mounting port-side main body base cloth, FIG. 2 is a front view showing a state in which four pieces of annular cloth are sewn to the air bag mounting port-side main body base cloth, FIG. 3 is a front view showing the manner in which the air bag mounting port-side main body base cloth and an occupant-side main body base cloth are stacked, and FIG. 4 is a front view showing a state in which the air bag mounting port-side main body base cloth and the occupant-side main body base cloth are sewn together.

First, a first circular main body base cloth 9 and a second circular main body base cloth 10 were cut from the above-described fabric. Then, the first main body base cloth 9 was provided, at its central portion, with a circular inflator mounting port 11 and two circular air outlets 12 at two positions (left and right pair) located upward of the mounting port 11 as shown in FIG. 1. Furthermore, the first main body base cloth 9 was provided with bolt fixing holes 13 at four positions surrounding the mounting port 11. Note that the second main body base cloth 10 is arranged on the occupant side, and was not provided with a mounting port, air outlets, or bolt fixing holes.

Also, a non-coated base cloth and a coated base cloth that was obtained by coating a base cloth with silicone resin were prepared as the reinforcement cloths. Also, as the reinforcement cloths for the inflator mounting port 11, three pieces of first annular cloth 14a were cut from the non-coated base cloth, and one piece of second annular cloth 14b having the same shape as the first annular cloth 14a was cut from the coated base cloth.

As shown in FIG. 1, all of the pieces of first annular cloth 14a and second annular cloth 14b were provided with bolt fixing holes at positions corresponding to the bolt fixing holes 13 of the first main body base cloth 9. Furthermore, the three pieces of first annular cloth 14a were overlaid on the first main body base cloth 9 such that the weaving direction of the reinforcement cloth was rotated by 45 degrees with respect to the weaving direction of the first main body base cloth 9 (see weaving directions A and B in FIG. 1) and the positions of the bolt fixing holes coincided with each other. Here, A shown in FIG. 1 indicates the weaving direction of the first main body base cloth 9 and B indicates the weaving direction of the pieces of annular cloth. The first main body base cloth 9 and the pieces of annular cloth 14a were sewn in a circular shape with the mounting port 11 serving as the center. Furthermore, similarly to the pieces of first annular cloth 14a, the piece of second annular cloth 14b was overlaid thereon with the same weaving direction as the pieces of first annular cloth 14a from the above, and the four pieces of first annular cloth 14a and second annular cloth 14b were sewn to the main body base cloth 9 in a circular shape (sewn portions 15a to 15c). The sewn state is shown in FIG. 2. Although there is no particular limitation on sewing, sewing can be performed through lock stitching using a nylon 66 sewing thread with the needle thread being 1400 dtex and the bobbin thread being 940 dtex with a stitch count of 3.5 stitches/cm, for example.

As shown in FIG. 3, the two main body base cloths 9 and 10 were then stacked such that the surfaces of the main body base cloths 9 and 10, with which the pieces of annular cloth 14a and 14b were seamed, were located outside and the weaving direction of the first main body base cloth 9 was rotated by 45 degrees with respect to the weaving direction of the second main body base cloth 10. Here, A shown in FIG. 3 indicates the weaving direction of the first main body base cloth 9 and C indicates the weaving direction of the second main body base cloth 10. Furthermore, outer circumferential portions of the overlaid first and second main body base cloths were sewn together through double thread chain stitching with two rows (sewn portion 15d). The sewn state is shown in FIG. 4. The bag was drawn out from the mounting port 11, and the inside and the outside were inverted after sewing so as to obtain a circular air bag. A sewing thread that was the same as the above-described thread used in lock stitching was used as the sewing thread for sewing the outer circumferential portions.

Figure 5:
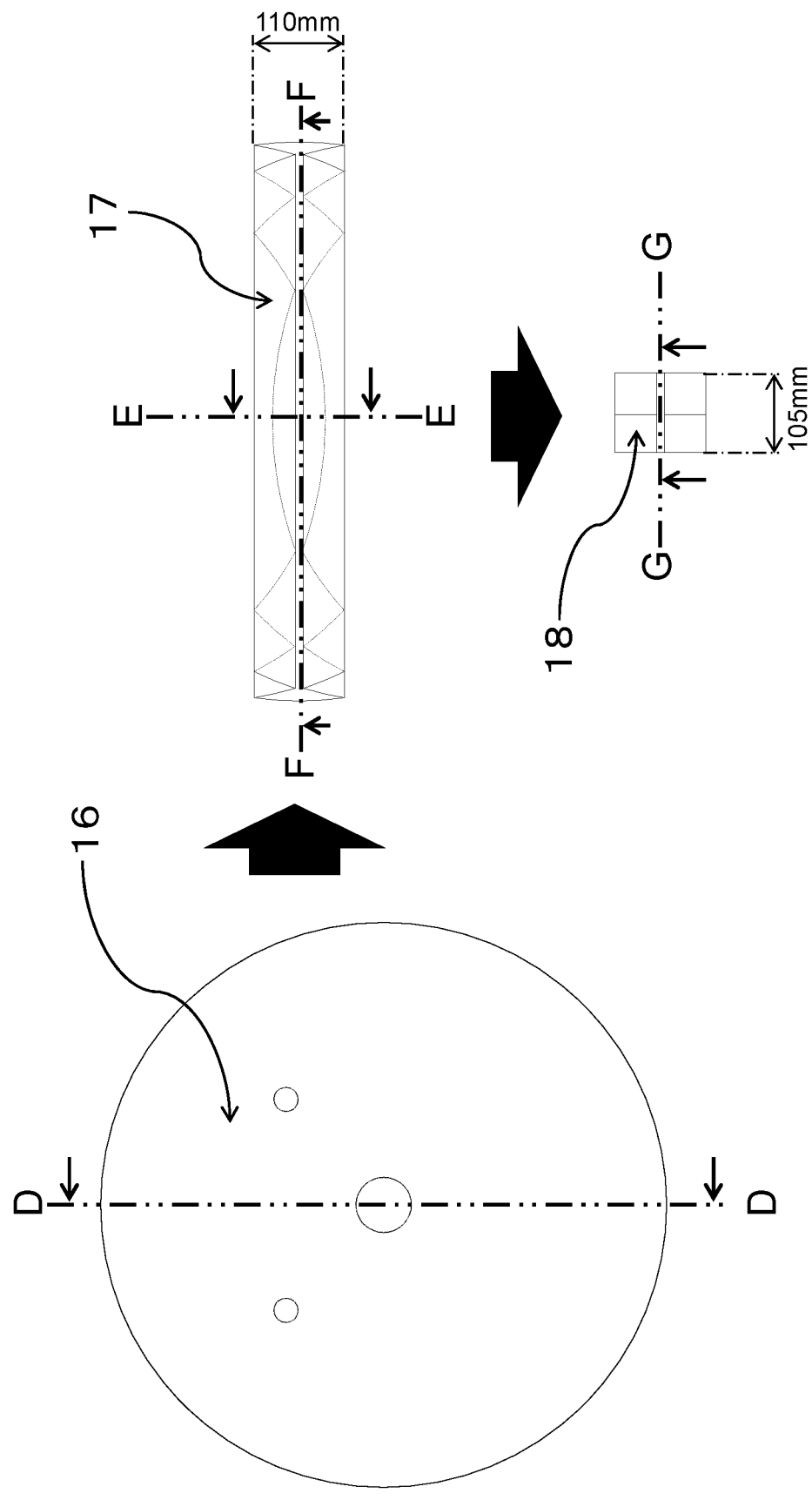
FIG. 5 is a diagram showing a procedure for folding an air bag.
Figure 6:
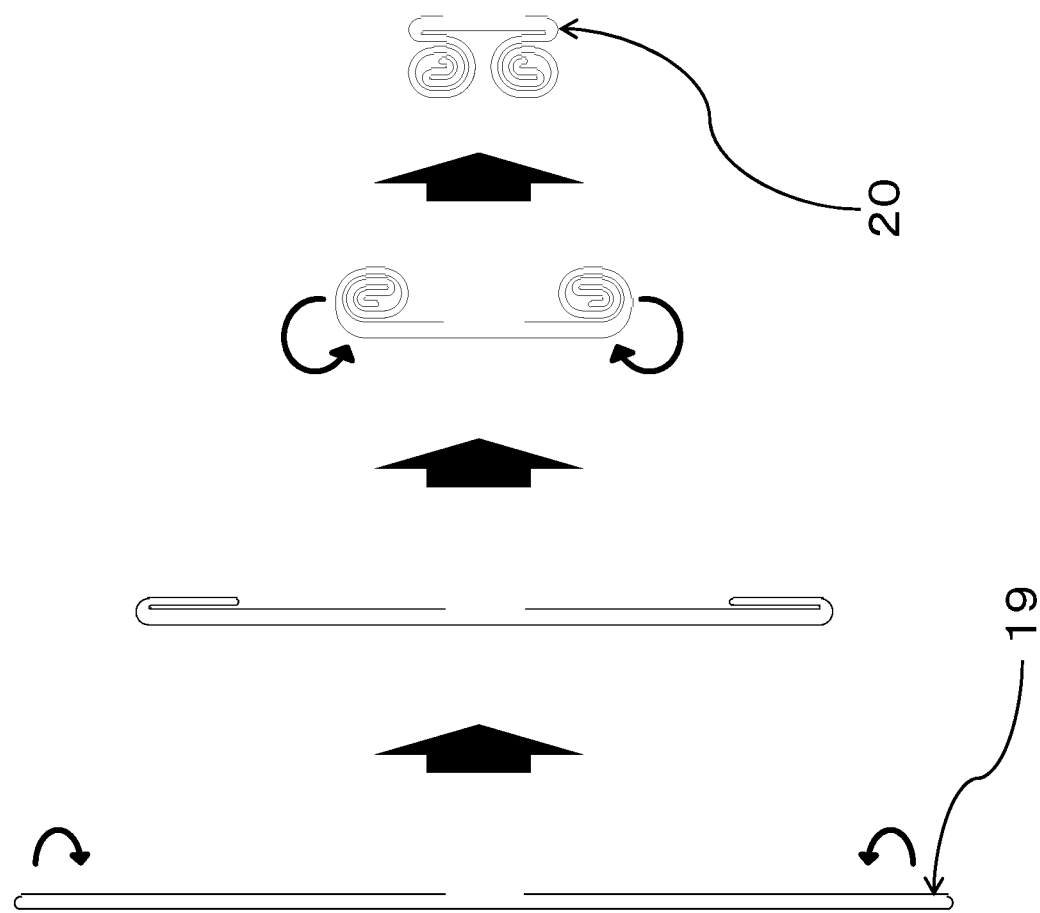
FIG. 6 is a diagram showing the procedure for folding the air bag.
Figure 7:
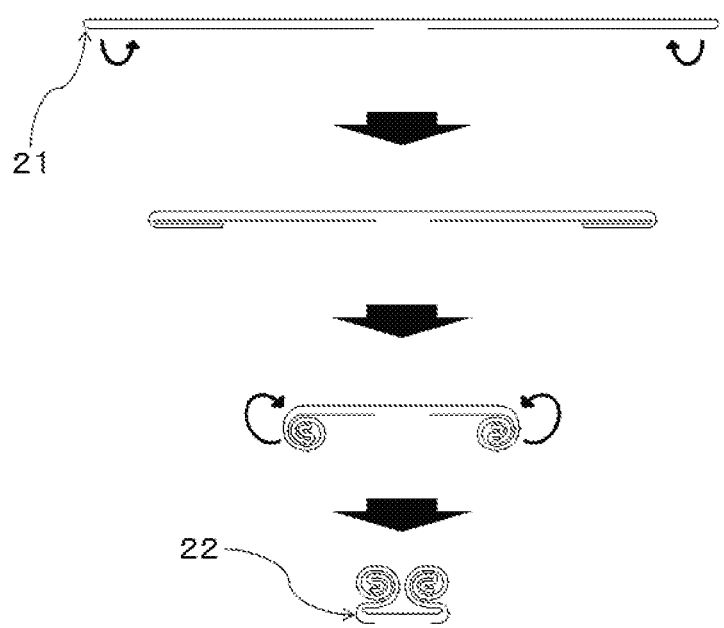
FIG. 7 is a diagram showing the procedure for folding the air bag.

Although there is no particular limitation on a method for folding an air bag, the air bag can be folded using the procedures shown in FIGS. 5 to 7, for example. FIG. 5 is a diagram showing a procedure used when an airbag is folded with the occupant side being the front, and FIG. 6 is a cross-sectional view of the air bag taken along line D-D, showing a procedure used when a pre-folding form 16 is folded into an intermediate form 17. FIG. 7 is a cross-sectional view of the air bag for evaluation taken along line F-F, showing a procedure used when the intermediate form 17 is folded into a completely folded form 18. Also, the cross-sectional view taken along line E-E of the intermediate form 17 shown in FIG. 5 is a final form 20 shown in FIG. 6. The cross-sectional view of the completely folded form 18 taken along line G-G shown in FIG. 5 is a final form 22 shown in FIG. 7.

WORKING EXAMPLES

Hereinafter, the present invention will be more specifically described based on working examples, but the present invention is not limited to these working examples. FIG. 8 shows the physical property values and results of evaluation of non-coated air bag fabrics according to Working Examples 1 to 8 and Comparative Examples 1 to 4. Also, methods for measuring and evaluating physical property values will be described below.

Total Fineness of Yarns

Measurement was performed in conformity with method B in JIS L 1013 8.3.1.

Number of Yarn Filaments

Measurement was performed in conformity with JIS L 1013 8.4.

Single Fiber Fineness

The single fiber fineness was obtained by dividing the total fineness of yarns by the number of yarn filaments.

Weave Density of Fabric

Measurement was performed in conformity with method A in JIS L 1096 8.6.1.

Thickness of Fabric

Measurement was performed in conformity with method A in JIS L 1096 8.4.

Air Permeability of Fabric

Measurement was performed in conformity with method A (Frazier method) in JIS L 1096 8.26.1.

Recovery Test from Folded State

A test was performed using the following procedures.

(1) Samples of working examples and comparative examples were cut to 5 cm×30 cm sizes in the warp and weft directions.

(2) The cut samples were each folded into an accordion-like shape at 2.5 cm intervals.

(3) A load of 0.75 kg was placed on the sample that was folded into an accordion shape, and was left for 24 hours.

(4) The load is removed after 24 hours, and the length of the sample was immediately measured using a ruler.

(5) A period of time from when the load was removed to when a recovery ratio reached 90% (27 cm) or more was measured.

(6) A recovery speed was calculated using the following equation, from the period of time when the recovery ratio reached 90%.

Recovery speed=(length immediately after load was removed−27 cm)/(period of time until length reached 27 cm)

(7) A to D evaluations were made based on the following criteria.

A: recovery speed was 0.65 mm/min or more

B: recovery speed was 0.50 mm/min or more and less than 0.65 mm/min

C: recovery speed was 0.35 mm/min or more and less than 0.50 mm/min

D: recovery speed was less than 0.35 mm/min

Note that it was confirmed that the air bags produced using Working Example 3 whose recovery speed was evaluated as A (0.65 mm/min or more) smoothly deployed. In contrast, it is predicted that if an air bag is produced using a fabric whose recovery speed is about 75% or less (less than 0.50 mm/min) of the recovery speed of the fabric whose recovery speed was evaluated as A, such air bag will not smoothly deploy. Thus, air bags whose recovery speed was less than 0.50 mm/min were classified into C and D evaluations, and air bags whose recovery speed was 0.50 mm/min or more and less than 0.65 mm/min were evaluated as B and judged as allowable.

Results of Evaluation of Recovery Tests

The results of evaluation are shown in FIG. 8. As shown in FIG. 8, Working Examples 1 to 6 had a good balance between the cover factor and the single fiber fineness, and had a high recovery speed. Among these examples, as with Working Example 1, even if the single fiber fineness was high, if the cover factor was low, balance was maintained and the recovery ratio was high. In contrast, as indicated by Working Example 8, even if the cover factor was large, if the single fiber fineness was low, the recovery ratio was high. Also, in this test, Working Example 5 had the best balance between the single fiber fineness and the cover factor, and had the highest recovery speed. In contrast, it is conceivable that as indicated by Working Example 7, if both the single fiber fineness and the cover factor are high, the flexibility will be impaired and the recovery speed will decrease although it will still be in an allowable range.

Also, it is conceivable that the single fiber fineness significantly affects air permeability, and Working Example 8 having the lowest single fiber fineness had the lowest air permeability, and Comparative Example 1 having the highest single fiber fineness had the highest air permeability.

On the other hand, Comparative Example 1 had a low cover factor, but Comparative Example 1 had low recovery speed due to having excessively high single fiber fineness. Also, because Comparative Examples 2 to 4 were all made of nylon, fibers excessively elongated when Comparative Examples 2 to 4 were folded, and creases were more likely to form, compared to Working Examples 1 to 8 made of polyethylene terephthalate. Thus, the recovery speed of Comparative Examples 2 to 4 was very low.

As described above, it is conceivable that a non-coted airbag fabric according to the present invention recovers from a folded state at a high recovery speed, and is suitable for deployment of an air bag.

LIST OF REFERENCE NUMERALS

9 Mounting port-side first main body base cloth
10 Occupant-side second main body base cloth
11 Inflator mounting port
13 Air outlet
11 Bolt fixing hole
14a, 14b Annular cloth
15a, 15b, 15c, 15d Sewn portion
A Weaving direction of first main body base cloth
B Weaving direction of annular cloth 14a
C Weaving direction of second main body base cloth

The invention claimed is:

1. A non-coated air bag fabric,
wherein the fabric is woven using fibers containing polyethylene terephthalate as a main raw material,
the fabric has a cover factor of 2350 or more and 2500 or less,
a single fiber fineness of a yarn that constitutes the fabric is 2.5 dtex or more and 3.0 dtex or less, and
the thickness of the fabric is 0.25 mm or more and 0.30 mm or less.

2. The non-coated air bag fabric according to claim 1, wherein the cover factor is 2450 to 2500.

3. An air bag, which is formed by at least one piece of main body base cloth formed by the non-coated air bag fabric according to claim 1.

4. A non-coated air bag fabric,
wherein the fabric is woven using fibers containing polyethylene terephthalate as a main raw material,
the fabric has a cover factor of 2500 or more, and
a single fiber fineness of a yarn that constitutes the fabric is 2.3 dtex or more and 2.5 dtex or less.

5. A non-coated air bag fabric according to claim 4, wherein the thickness of the fabric is 0.25 mm or more and 0.30 mm or less.

* * * * *